United States Patent [19]
Seda

[11] Patent Number: 5,519,619
[45] Date of Patent: May 21, 1996

[54] ROUTE PLANNING METHOD FOR HIERARCHICAL MAP ROUTING AND APPARATUS THEREFOR

[75] Inventor: Joseph W. Seda, Wheeling, Ill.

[73] Assignee: Motorola, Inc., Schaumburg, Ill.

[21] Appl. No.: 209,590

[22] Filed: Mar. 14, 1994

[51] Int. Cl.⁶ .............................................. G06F 165/00
[52] U.S. Cl. ................................................ 364/444
[58] Field of Search ................................ 364/444, 449; 340/988, 995

[56] References Cited

U.S. PATENT DOCUMENTS

| | | | |
|---|---|---|---|
| 4,984,168 | 1/1991 | Neukrichner et al. | 364/449 |
| 5,168,452 | 12/1992 | Yamada et al. | 364/444 |
| 5,272,638 | 12/1993 | Martin et al. | 364/444 |
| 5,285,391 | 2/1994 | Smith, Jr. et al. | 364/443 |

*Primary Examiner*—Michael Zanelli
*Attorney, Agent, or Firm*—Nicholas C. Hopman

[57] ABSTRACT

A route planning method, and apparatus, for constructing a route connecting a given origin location and a given destination location from a hierarchical map database having more than one layer, where each layer represents a different level of detail. The method includes provision of a list of road segments extracted from an initial planning layer of the hierarchical map database, wherein each of the road segments in the list of road segments are connected to the given origin location. An alternative planning layer is selected dependent on exceeding a predetermined heading criteria measured between a heading associated with heading associated with one of the road segments in the list of road segments and a heading associated with the given destination location.

26 Claims, 3 Drawing Sheets

ROUTE PLANNING METHOD FOR HIERARCHICAL MAP ROUTING AND APPARATUS THEREFOR

FIELD OF THE INVENTION

This invention is generally directed to the field of navigation based route planners. In particular, it is useful for constructing a route planner for use with a hierarchical type map database.

BACKGROUND OF THE INVENTION

Contemporary map route planning systems can be characterized into two groups, those that are single-ended and those that are dual-ended. Both of these approaches rely on a map database that represents roads in terms of road segments. Typically, these road segments are stored in the map database that covers a geographical area including many road segments. Each road segment contained within the map database is typically defined in terms of two locations on the earth. Often these locations are coded in terms of latitude and longitude.

Route planning mechanisms, associated with the above-mentioned map route planning systems, search the map database for road segments that connect, or provide a traversable path between, a given origin location and destination location. For searching efficiency reasons the map databases are often coded into several layers, each representing progressive levels of detail of the represented road map. This type of map database is often referred to as a hierarchical map database.

Typically, these maps are constructed as follows. A lowest level (layer 0) would be coded to represent all known road segments located within a geographical area represented by the map database. Another level (layer 1) would be coded to represent the same geographical area as layer 0 but in a lower level of detail. For instance, on layer 1 all of the local road segments would be eliminated. Another level (layer 2) would be coded to represent the same geographical area as layer 1 but in yet another lower level of detail. For instance, on layer 2 all of the collector road segments would be eliminated. Another level (layer 3) would be coded to represent the same geographical area as layer 2 but in yet another lower level of detail. For instance, on layer 3 all of the arterial road segments would be eliminated. In this case layer 3 would only represent limited access, for instance highway, road segments.

In the case of dual-ended route planners, a solution may be found more quickly for small databases since the planning mechanism concurrently plans two routes each originating at the origin location and destination location hoping to meet in the middle. Although this method is typically faster in practice, it is also much more resource intensive. This is because the planning mechanism requires extracting road segments from two parts of the map database, significantly increasing temporary storage resources. Dual-ended route planning mechanisms also suffer when dynamic route characteristics are being considered. For instance, traffic density in terms of congestion may be available for an area proximate the origin location and the destination location. Since a path is simultaneously planned commencing from both the origin location and the destination location certain assumptions must be made regarding the time of arrival at the destination location. Because of this initial assumption the traffic congestion information may not match the actual traffic congestion present when the traveler actually arrives at the destination location.

In a single-ended route planning approach, by directing the route planning mechanism to start searching on the highest level (layer 3) first, a route between an origin and a destination may be found within a few iterations because there are only a relatively few road segments. Generally, the route planning mechanism commences with the origin location and queries the map database for all road segments connected to that origin. Next, if it found any, these road segments are expanded to include any successor road segments that progress towards the destination location. As is often the case, a route is not found at this highest level. When this happens the route planning mechanism will traverse downwardly to the next level of detail, here layer 2. Again the route planning mechanism continues planning by querying the map database at layer 2. This process is continued with further expansion of successor road segments and downward traversals until a route is connected between the origin and destination locations.

As a practical matter, this approach can be very resource intensive. So any improvement in this process is valuable. One problem with this approach can be illustrated with a brief example.

FIGS. 1a–1c illustrate a hierarchical map database covering a geographical area comprised two levels; layer 3 101 and layer 2 103. Here layer 3, similar to the layer 3 mentioned above, represents the coarsest level of the hierarchical map database. Also, just as mentioned above, layer 2 103 covers the same geographical area as layer 3 101 of the hierarchical map database but represents the geographical area in finer detail. Reference number 105 shows a route resulting from the prior art mapping approach. This routing result 105 is arrived at as follows.

An origin location 107 and a destination location 117, shown in the layer 3 map 101, are provided to the route planning mechanism as a prerequisite to the route planning process. Successor road segments 109, 111, 115 are expanded during the planning process, and thus a solution is found, using these successor road segments, to connect routes between the origin location 107 and the destination location 117. However, when viewing the next level of map detail, shown in layer 2 103, one can observe that a more optimal route, in terms of distance traversed, can be had. So, as can be seen by this example, the route planned as shown in the routing result box 105 is clearly less than optimal given the level of granularity available on layer 2 103 of the hierarchical map database. In other words if the route planning mechanism planned on layer 2, then a shorter route can be planned, albeit using more resources to plan the route because of the increased road segment density. This is because planning only at layer 2 103 requires consideration of more successor road segments which is less efficient in terms of quickly connecting the route between the origin location 107 and the destination location 117.

What is needed is a more efficient lower resource intensive and higher resulting route quality planner. This would preferably be compatible with a single-ended approach and have a means for traversing between layers to construct optimal routes in terms of allocating planning resources effectively and generating a shortest route.

DETAILED DESCRIPTION OF A PREFERRED EMBODIMENT

An improved route planning method, and apparatus, for constructing a route connecting a given origin location and a given destination location from a hierarchical map database having more than one layer, where each layer represents a different level of detail. The method includes provision of a list of road segments extracted from an initial planning layer of the hierarchical map database. Each segment in the list of road segments is connected to the given origin location. An alternative planning layer is selected dependent on exceeding a predetermined heading criteria measured between a heading associated with one of the road segments in the list of road segments and a heading associated with the given destination location.

Figure 1A:
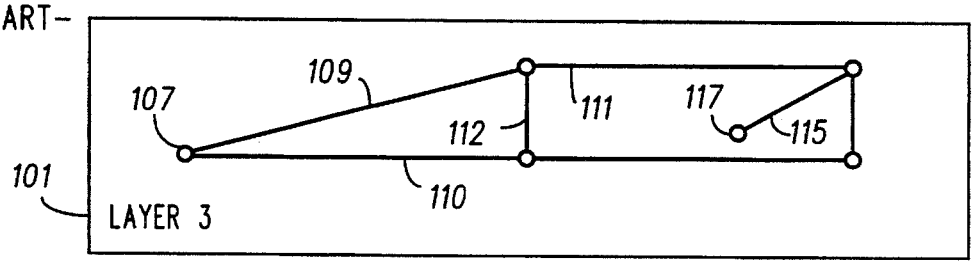
FIGS. 1a–1c are a schematic diagram illustrating several layers of a hierarchical map database and results of a prior art approach to route planning.
Figure 1B:
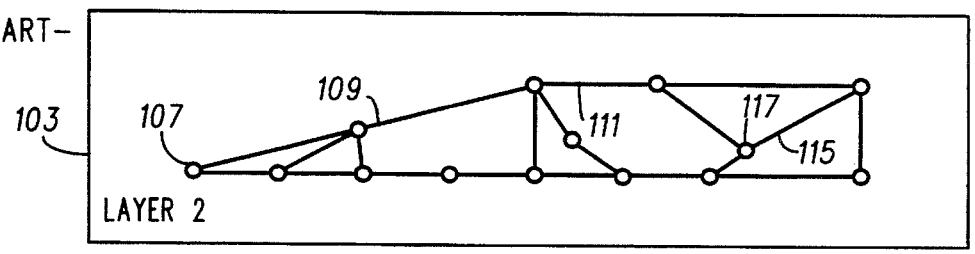
Figure 1C:
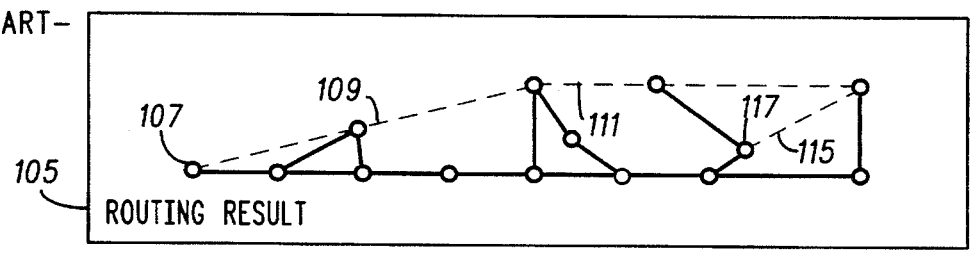

In a preferred embodiment other criteria are added to the above-mentioned essential criteria. For instance, the alternative planning layer may be selected based on a proximity between one of the road segments in the list of road segments and the given destination location. Also, if one of the road segments in the list of road segments is congested another planning layer may be selected. A complete understanding of all of the inventive features can be better appreciated with a review of the accompanying figures. Details of FIGS. 1a–1c are described in the background section.

Figure 2:
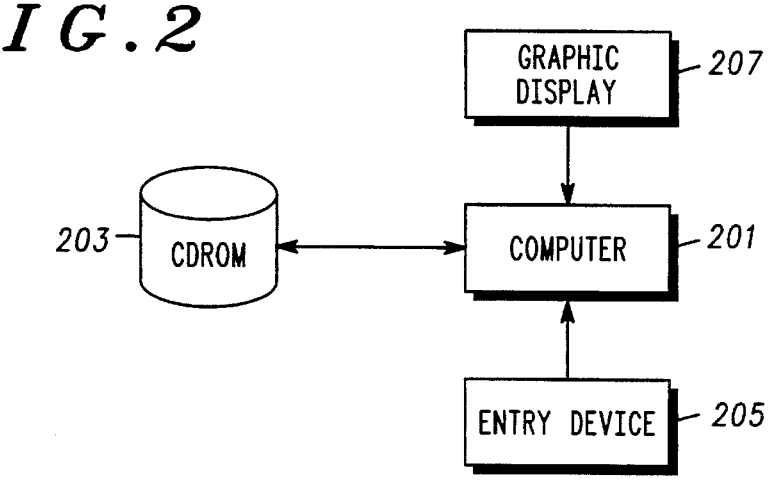
FIG. 2 is an apparatus for executing the method steps described in the preferred embodiment.

FIG. 2 is a block diagram of an apparatus for executing the method steps described in the preferred embodiment. A computer 201, preferably based on a Motorola MC68340 microcontroller, includes program memory in the form of ROM. The later detailed method steps can be encoded into the ROM indigenous to the computer 201. Those skilled in the an will be quick to recognize other computer configurations that will also suffice.

A CDROM 203, or Compact Disk Read Only Memory, reader 203 is coupled to the computer 201. The CDROM reader 203 is used to read digital map databases stored on CDROM media. Note that the digital map database in the preferred embodiment is hierarchical in construction. Also, the hierarchical map database has more than one layer. Each layer represents the same geographical area in successive levels of detail. For instance, as mentioned in the background section and shown in FIG. 1b at reference number 103, layer 2 is coded to represent all known road segments located within a geographical area represented by the map database. Layer 3 101 is coded representing the same geographical area as layer 2 but in a lower level of detail. Although this example illustrated only two layers many hierarchical map databases are constructed with more layers.

An entry device 205 is also coupled to the computer 201 for the purpose of enabling a user to input various navigation related information. Here, the user is a vehicle operator and the operator will use the entry device 205 to input a desired destination location, and optionally a desired origin location for a trip to be planned. An actual origin location can also be provided by an absolute positioning system.

A graphic display 207 is also coupled to the computer 201 for the purpose of displaying various route planning and route guidance information to the vehicle operator. Next, details of the method will be discussed.

Figure 3:
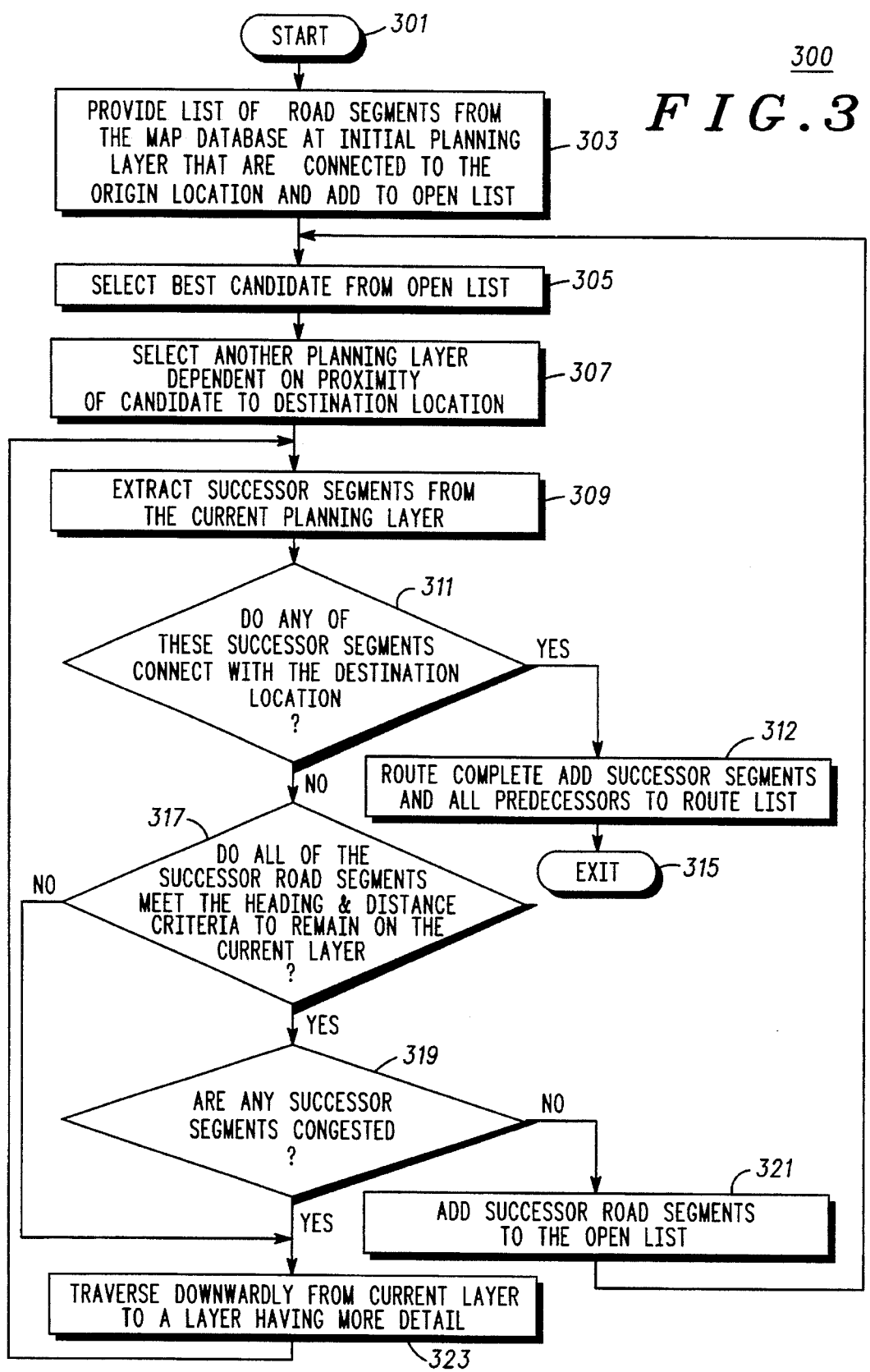
FIG. 3 is a flow chart included to help illustrate certain inventive aspects of the disclosed invention.

FIG. 3 is a flow chart representing method steps of a software routine 300. As mentioned above, the method steps shown in this flow chart are encoded into ROM in the computer 201. These method steps are executed whenever the vehicle operator requests a route to be planned. The routine 300 is entered in step 301. External to this routine 300, a desired destination location, and origin location are provided as described above.

In step 303 an open list of road segments is provided. This open list of road segments is extracted from an initial planning layer of the hierarchical map database located in CDROM 203. In this example layer 3 101 is the initial planning layer. The open list of road segments are all connected to the given origin location. The initial planning layer is considered a current planning layer.

Next, in step 305 a best candidate road segment is selected from the open list of road segments. This best candidate road segment is selected based on a traditional A* method. The A* method is an estimation technique applied to rate different partial routes to select a best route to continue planning. The A* method does this by summing an actual cost of a partially planned route under consideration and an estimate of the cost to complete the route. This is done for several routes and then a best route is selected. The A* method is well known to those skilled in the art. For a further understanding of the A* method one may refer to the treatise entitled "Artificial Intelligence", authored by Elaine Rich, published by the McGraw-Hill Book Company in 1983.

Next, in step 307 another planning layer, layer 2, can be selected from the more than one layer of the hierarchical map database. Here the selection is dependent on a distance between the given destination location and a location associated with the candidate road segment. Typically, this location associated with the current road segment, is the location most proximate the destination location—often the termination or end of the current road segment. If another planning layer is selected in step 307, then it becomes the current planning layer. Otherwise, the initial planning layer, layer 3, remains the current planning layer.

In step 309 the planned route is expanded by extracting at least one successor road segment from the current planning layer. This successor road segment is connected to the candidate road segment. Note that as the planning process iterates the extracted successor road segment will be a successor of another successor road segment, rather than a successor of the candidate road segment. Of course, multiple successor road segments may also be extracted in this step if more than one successor road segment is connected to the candidate road segment on the current planning layer.

Next, in step 311 the computer 201 determines if any of the one or more successor road segments provide a connection path to the given destination location. If one does, then the route is complete and the qualifying road segment and all of its predecessors are added to a route list in step 312, and the routine 300 is exited at step 315. If there is no connection path between any of the one or more successor road segments and the given destination location, then the routine 300 continues to step 317.

In step 317 an alternative planning layer can be selected dependent on whether or not any of the successor segments under consideration exceed a predetermined heading criteria, or whether or not any of the successor segments under consideration do not exceed a distance proximity criteria. In other words if the destination location is behind (as determined by the heading test) the currently planned location, or is very close (as determined by the proximity test), then the route planner will traverse downwardly to get more detail. Therefore, this alternative planning layer is a layer having more detail than the current planning layer. The heading criteria can be modeled as an envelope positioned normal to the heading of the successor segment under consideration. If a difference between a heading of the successor road segment under consideration and a heading from an end of the successor road segment to the destination location falls outside this envelope then the planning method traverses downwardly to a layer having more detail.

In the preferred embodiment a heading criteria of ±70° is used. This means that if the difference between the heading of the successor road segment and the destination location is greater than ±70° then the alternative planning layer is selected and the route planner thereby traverses downwardly to a layer having more detail. Of course, given this teaching, other heading criteria may be applied. Preferably, the difference in heading criteria is below ±145°. Also, given this teaching, various interpretations of the heading associated with the successor road segment can be applied. For instance, typically road segments are encoded having a straight geometry. In this case the heading of the successor road segment may be derived directly from a heading average between end point positions of the road segment. Alternatively, if the successor road segment has a non-linear geometry, such as an expressway ramp, a frontage road, or other non-linear geometry the heading may be derived from the commencement or termination of the road segment.

If in step 317 all of the road segments do meet the heading and distance criteria to remain on the current layer, then step 319 is executed. In step 319 the successor road segments are again tested to see if any of the successor road segments are congested. If not, then the successor road segment or road segments under consideration are added to an open list in step 321, and the method continues at step 305. If in step 319 any of the successor road segments were congested then step 323 is executed. If any of the successor road segments are congested then it is necessary to traverse downwardly to a layer having more detail to discover where the congestion is located so that the planning method can avoid it.

The real benefit of steps 317 and 319 is to traverse downwardly only when desirable so as to not waste planning resources, (which would happen if downward traversal was selected too early in the planning process) while planning the most efficient route (by traversing downwardly before it's too late to plan the most efficient route).

So, if an alternative planning layer is selected in step 323, then the routine 300 continues at step 309. This routine 300 is iterated until a satisfactory route is completed.

A working example illustrating the benefit of the above described method can be understood by referring to FIGS. 1a–1c, FIG. 3, FIG. 4, and FIG. 5 while reviewing the following explanation.

Returning to the example hierarchical map database layers originally introduced in the background section, an origin location 107 and a destination location 117 can be found on layer 3 101. The apparatus shown in FIG. 2 executes the routine 300 commencing at step 301.

In step 303 the route planner extracts a list of road segments from the CDROM database 203 at the initial planning layer, here layer 3. Two road segments are extracted 109 and 110. Applying the above-mentioned A* algorithm road segment 109 is selected as the candidate road segment. Here, road segment 110 may be disqualified for many reasons including too low a speed limit.

Then, in step 307 another planning layer may be selected dependent on a proximity of candidate road segment 109 to the destination location 117. In this case the proximity or distance between the candidate road segment 109 and the destination location 117 is measured between an end or termination location of candidate road segment 109 and the destination location 117. When considering proximity of distances on layer 3 typically a metric of 25 miles is used. Of course this metric of 25 miles is configurable to other distances deemed advantageous to the particular hierarchical map database and the planning method. Since in this case candidate road segment 109 is sufficiently distant (greater than 25 miles) from the destination location 117, the planning mechanism remains on the current layer, layer 3.

Next, in step 309 successor road segments 111 and 112 are extracted from the candidate road segment 109 on layer 3 101.

Next, in step 311 these successor road segments 111 and 112 are tested to see whether or not they connect with the destination location 117. In this example they do not.

Then, step 317 is executed. In step 317 the successor road segments 111 and 112 are tested to see whether or not they meet the heading and distance criteria.

Here a distance criteria of 25 miles is used again because the planning method is still planning on layer 3. If the current layer was layer 2, then the distance criteria is preferably set to 8 miles. Of course, as mentioned above, other distance criteria may be used. This 25 mile test is used to eliminate traversing downwardly too soon when traversing relatively large distances—for instance when traversing between major cities. Here, it is assumed that the distance between the termination location of the successor road segment 111 and the destination location 117 is greater than 25 miles—so no downward traversal is actioned here. Next a projected heading at the termination location of successor road segment 111 is compared to a projected heading of the destination location 117. This is shown graphically in FIG. 4.

Figure 4:
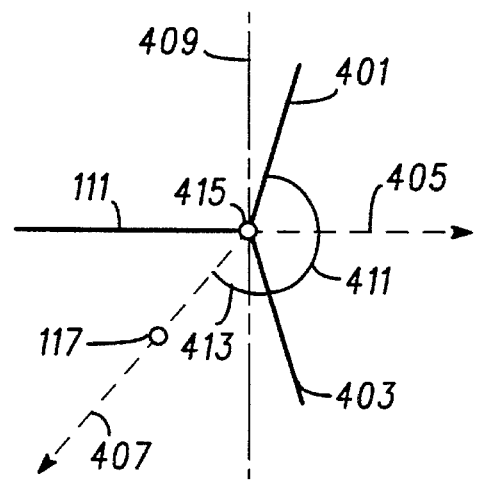
FIG. 4 is a schematic diagram illustrating various route selections dependent on the approach described in a preferred embodiment.

Referring to FIG. 4, successor road segment 111 is illustrated. Reference number 405 shows the projected heading at the termination location of successor road segment 111. Reference number 407 shows the projected heading at the destination location 117. Reference numbers 401 and 403 illustrate the ±70° heading envelope or boundary positioned normal to the projected heading at the termination location of successor road segment 111. The position of the heading envelope can be seen by the normal relationship between the projected heading at the termination location of successor road segment 111, and the reference line 409. Reference number 411 illustrates the ±70° span defining the heading envelope. Reference number 413 shows that the projected heading at the destination location 117 is outside the heading envelope. Therefore, the result of step 317, even before considering the other successor road segment 112, is that all of the successor road segments under consideration do not meet the heading criteria to allow the planning method remain on the current layer, and step 323 is thereby executed and the route planning method traverses downwardly to layer 2.

Figure 5:
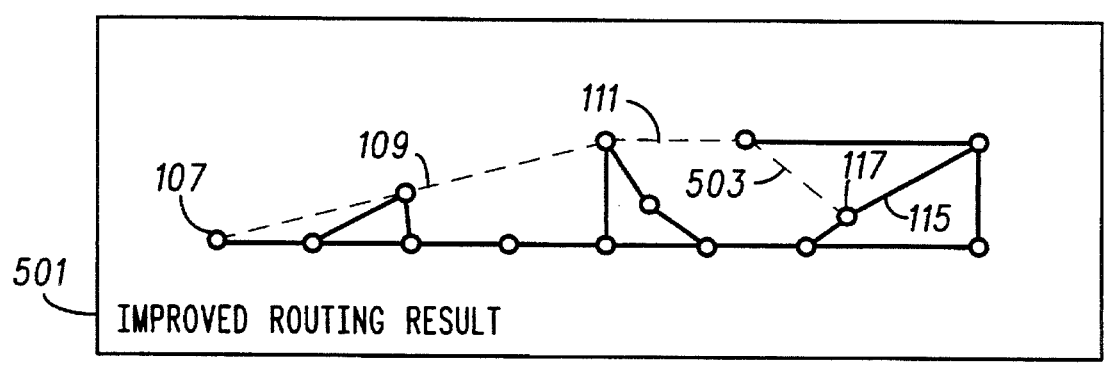
FIG. 5 is a schematic diagram illustrating a result of route planning using an improved method in accordance with an embodiment of the present invention.

FIG. 5 is a schematic diagram illustrating the result of iterating the route planning routine 300 until an optimal route is completed. Note that the downward traversal to layer 2 divided the successor road segment 11 into two smaller sections and revealed a successor road segment 503 that enabled more efficient coupling between the origin location 107 and the destination location 117.

In conclusion, an improved method of route planning by engineering a downward traversal method for a hierarchical map database has been detailed above. It significantly improves the quality of the route planned because it forces the route planning method to continue planning on the least detailed layer for as long as efficient. Typically, this minimizes the load on the route planning method and apparatus because fewer route segments are under consideration for the majority of the planning process. Then, when the route planner provides road segments that are close in proximity to the destination location, or outside of a heading envelope, indicating that the planner may be considering a road segment located beyond the desired destination location, the planner traverses downwardly to a layer having more detail so that a more efficient route can be planned.

What is claimed is:

1. A route planning method for constructing a route connecting a given origin location and a given destination location from a hierarchical map database having a plurality of layers each layer representing a different level of detail, the method comprising the steps of:

providing a list of road segments extracted from an initial planning layer of the hierarchical map database, wherein each of the road segments in the list of road segments are connected to the given origin location; and selecting an alternative planning layer dependent on exceeding a predetermined heading criteria measured between a heading associated with one of the road segments in the list of road segments and a heading associated with the given destination location.

2. A method in accordance with claim 1 further comprising a step of selecting the initial planning layer from the plurality of layers of the hierarchical map database, the selection dependent on a distance between the given destination location and a location associated with the one of the road segments.

3. A method in accordance with claim 1 wherein the predetermined heading criteria applied in said step of selecting an alternative planning layer is applied by projecting a heading envelope positioned normal to a projected heading at a termination location of the one of the road segments.

4. A method in accordance with claim 3 wherein the heading envelope is less than ±145°.

5. A method in accordance with claim 1 wherein the heading associated with the one of the road segments is derived from end point positions of the one of the road segments.

6. A method in accordance with claim 5 wherein the heading represents an average heading between the end point positions of the one of the road segments.

7. A method in accordance with claim 1 wherein the heading associated with the one of the road segments is a heading at a termination of the one of the road segments.

8. A method in accordance with claim 1 wherein the heading associated with the one of the road segments is a heading at a commencement of the one of the road segments.

9. A method in accordance with claim 1 further comprising a step of determining if any of the one of the road segments on the current planning layer are congested; and wherein said step of selecting an alternative planning layer further comprises selecting an alternative planning layer if any of the one of the road segments on the current planning layer are congested.

10. A route planning method for constructing a route connecting a given origin location and a given destination location from a hierarchical map database having a plurality of layers each layer representing a different level of detail, the method comprising the steps of:

providing a list of road segments extracted from an initial planning layer of the hierarchical map database, wherein each of the road segments in the list of road segments are connected to the given origin location;

selecting a candidate road segment from the list of road segments provided in said step of providing;

selecting another planning layer from the plurality of layers of the hierarchical map database, the selection dependent on a distance between the given destination location and a location associated with the candidate road segment;

extracting at least one successor road segment, connected to the candidate road segment, from a current planning layer corresponding one of the initial planning layer and the another planning layer;

determining if the at least one successor road segment provides a connection path to the given destination location; and selecting an alternative planning layer dependent on exceeding a predetermined heading criteria measured between a heading associated with the at least one successor road segment and a heading associated with the given destination location.

11. A method in accordance with claim 10 wherein said step of selecting another planning layer is executed prior to said step of selecting an alternative planning layer.

12. A method in accordance with claim 11 wherein the alternative planning layer, selected in said step of selecting an alternative planning layer, is a layer having more road segments than the another planning layer selected in said step of selecting another planning layer.

13. A method in accordance with claim 10 wherein the predetermined heading criteria applied in said step of selecting an alternative planning layer is applied by projecting a heading envelope positioned normal to a projected heading at a termination location of the successor road segment.

14. A method in accordance with claim 13 wherein the heading envelope is less than ±145°.

15. A method in accordance with claim 10 wherein the heading associated with the successor road segment is derived from end point positions of the successor road segment.

16. A method in accordance with claim 15 wherein the heading represents an average heading between the end point positions of the successor road segments.

17. A method in accordance with claim 10 wherein the heading associated with the successor road segment is a heading at a commencement of the successor road segment.

18. A method in accordance with claim 10 wherein said step of selecting another planning layer comprises selecting another planning layer using an A* method.

19. A method in accordance with claim 10 further comprising a step of determining if any of the one of the successor road segments on the current planning layer are congested; and wherein said step of selecting an alternative planning layer further comprises selecting an alternative planning layer if any of the successor road segments on the current planning layer are congested.

20. An apparatus for constructing a route connecting a given origin location and a given destination location from a hierarchical map database having a plurality of layers each layer representing a different level of detail, the apparatus comprising:

means for providing a list of road segments extracted from an initial planning layer of the hierarchical map database, wherein each of the road segments in the list of road segments are connected to the given origin location; and means for selecting an alternative planning layer dependent on exceeding a predetermined heading criteria measured between a heading associated with one of the road segments in the list of road segments and a heading associated with the given destination location.

21. An apparatus in accordance with claim 20 further comprising a means for selecting the initial planning layer from the plurality of layers of the hierarchical map database, the selection dependent on a distance between the given destination location and a location associated with the one road segment.

22. An apparatus in accordance with claim 20 wherein the predetermined heading criteria applied in said means for selecting an alternative planning layer is applied by projecting a heading envelope positioned normal to a projected heading at a termination location of a successor road segment.

23. A method in accordance with claim 22 wherein the heading envelope is less than ±145°.

24. An apparatus in accordance with claim 22 wherein the heading associated with one of the road segments represents an average heading between end point positions of the successor road segment.

25. An apparatus in accordance with claim 22 wherein the heading associated with the successor road segment is a heading at a termination position of the successor road segment.

26. An apparatus in accordance with claim 22 wherein the heading associated with the successor road segment is a heading at a commencement position of the successor road segment.

* * * * *